(12) United States Patent
Heni et al.

(10) Patent No.: US 12,228,838 B2
(45) Date of Patent: Feb. 18, 2025

(54) PUSH-PULL DEVICE AND METHOD FOR FABRICATING A PUSH-PULL DEVICE

(71) Applicant: ETH ZURICH, Zürich (CH)

(72) Inventors: Wolfgang Heni, Zürich (CH); Juerg Leuthold, Neerach (CH)

(73) Assignee: ETH ZURICH, Zurich (CH)

( * ) Notice: Subject to any disclaimer, the term of this patent is extended or adjusted under 35 U.S.C. 154(b) by 202 days.

(21) Appl. No.: 17/905,504

(22) PCT Filed: Feb. 17, 2021

(86) PCT No.: PCT/EP2021/053861
§ 371 (c)(1),
(2) Date: Sep. 2, 2022

(87) PCT Pub. No.: WO2021/175590
PCT Pub. Date: Sep. 10, 2021

(65) Prior Publication Data
US 2023/0161182 A1    May 25, 2023

(30) Foreign Application Priority Data
Mar. 2, 2020 (CH) .................................... 00250/20

(51) Int. Cl.
*G02F 1/225* (2006.01)
*G02F 1/035* (2006.01)
(Continued)

(52) U.S. Cl.
CPC .............. *G02F 1/225* (2013.01); *G02F 1/035* (2013.01); *G02F 1/011* (2013.01); *G02F 1/065* (2013.01);
(Continued)

(58) Field of Classification Search
CPC ........ G02F 1/035; G02F 1/0356; G02F 1/065; G02F 1/225; G02F 1/2255; G02F 1/3558; G02F 2202/07
See application file for complete search history.

(56) References Cited

U.S. PATENT DOCUMENTS

| 6,178,280 B1 * | 1/2001 | Maxwell | G02F 1/3558 |
| | | | 385/132 |
| 6,558,585 B1 * | 5/2003 | Zhang | G02F 1/065 |
| | | | 264/435 |

(Continued)

FOREIGN PATENT DOCUMENTS

WO    WO 2019/187930 A1 * 10/2019

OTHER PUBLICATIONS

International Search Report dated May 14, 2021 in International Application No. PCT/EP2021/053861.

*Primary Examiner* — Michael Stahl
(74) *Attorney, Agent, or Firm* — Quantum Patent Law Firm; Seongyoune Kang

(57) ABSTRACT

A push-pull device (10) comprises: a first waveguide (W1) arranged between its first and second electrode (S11, S12) and a second waveguide (W2) arranged between its first and a second electrode (S21, S22). Electrically conductive structures (T11, T12, T21, T22) extend away from one or more of the electrodes (S11, S12, S21, S22) for electrically connecting at least two of the electrodes (S11, S12, S21, S22). The waveguides (W1, W2) and the electrodes (S11, S12, S21, S22) originate from a pre-fabrication process. The waveguides (W1, W2) are poled by a poling (P) originating from a poling process. The electrically conductive structures (T11, T12, T21, T22) originating: from the pre-fabrication process, wherein one or more of the electrically conductive structures (T11, T12, T21, T22) extend to one or more electrically non-conductive gaps (G1, G2), and wherein the (Continued)

device (10) further comprises one or more electrically conductive elements (C1, C2) for electrically connecting two of the electrodes (S11, S12, S21, S22), the electrically conductive elements (C1, C2) being related to the electrically non-conductive gaps (G1, G2) and originating from a post-fabrication process; and/or from a post-fabrication process.

16 Claims, 10 Drawing Sheets

(51) Int. Cl.
*G02F 1/01* (2006.01)
*G02F 1/065* (2006.01)
*G02F 1/355* (2006.01)

(52) U.S. Cl.
CPC ...... *G02F 1/3558* (2013.01); *G02F 2201/126* (2013.01); *G02F 2202/07* (2013.01)

(56) References Cited

U.S. PATENT DOCUMENTS

| | | | |
|---|---|---|---|
| 6,711,308 B2 * | 3/2004 | Erben | G02B 6/26 |
| | | | 385/3 |
| 9,664,931 B1 * | 5/2017 | Yap | G02F 1/225 |
| 10,451,951 B1 * | 10/2019 | Yap | G02F 1/2255 |
| 2008/0089633 A1 * | 4/2008 | Moeller | G02F 1/0356 |
| | | | 385/2 |
| 2009/0148111 A1 * | 6/2009 | Nakamura | G02F 1/065 |
| | | | 385/122 |
| 2010/0040322 A1 * | 2/2010 | Li | G02B 6/1221 |
| | | | 438/27 |
| 2014/0086523 A1 | 3/2014 | Block et al. | |

* cited by examiner

PUSH-PULL DEVICE AND METHOD FOR FABRICATING A PUSH-PULL DEVICE

CROSS-REFERENCE TO RELATED APPLICATIONS

This application is a U.S. national stage application of International Application No. PCT/EP2021/053861, filed Feb. 17, 2021 and the entire contents of which are incorporated herein by reference, which claims priority to Swiss Patent Application No. CH 00250/20, filed on Mar. 2, 2020 and the entire contents of which are incorporated herein by reference.

FIELD OF THE INVENTION

The present invention relates to a push-pull device and a method for fabricating a push-pull device. In particular, the present invention relates to a push-pull device for differential signals.

BACKGROUND ART

Push-pull devices, plasmonic devices or plasmonic push-pull devices enable conversion of an electrical signal into an optical signal, or vice versa, respectively modulation of an optical signal in accordance with an electrical signal, or vice versa. Plasmonic devices enable building electro-optic devices having high speed, low optical loss, high modulation depth, compact footprint, and low energy consumption. Plasmonic devices enable high-density integrated circuit solutions. Plasmonic devices may introduce materials with a negative permittivity, e.g. metals, to overcome the diffraction limit, to localize and guide light, and to offer intrinsic high-speed behavior.

Baeuerle et al., 120 GBd plasmonic Mach-Zehnder modulator with a novel differential electrode design operated at a peak-to-peak drive voltage of 178 mV, Optics Express, 3 Jun. 2019 and Baeuerle et al., Dual-Drive Plasmonic Transmitter with Co-Designed Driver Electronics operated at 120 GBd On-Off Keying, OFC 2019, Optical Fiber Communication Conference 2019, San Diego, California United States, 3-7 Mar. 2019 disclose a plasmonic dual-drive transmitter. A power multiplexer generates a differential electrical signal which is connected via electrodes with the plasmonic-organic hybrid Mach-Zehnder modulator. Light is coupled via grating couplers to the chip and silicon photonic waveguides direct the light to the plasmonic phase shifters.

Wolfgang Heni, Plasmonic-Organic Hybrid Modulators, Diss.-No. ETH 25785, 2019 discloses electric field poling of an organic material of a plasmonic Mach-Zehnder modulator by applying a voltage between the outer electrodes of the modulator. The electric field aligns the molecules of the nonlinear optical material in the direction of the electric field. For device operation, the modulator is contacted by ground-signal-ground microwave probes, wherein the device poling direction and the driving field oppose each other in one slot and point in the same direction in the other slot.

DISCLOSURE OF THE INVENTION

There may be a need for an improved push-pull device avoiding some drawbacks of the prior art. More particularly, there may be a need for an improved push-pull device with an efficient use of a driving signal. More particularly, there may be a need for an improved push-pull device which is adapted for differential signals. More particularly, there may be a need for an improved push-pull device which is adapted for chip packaging. More particularly, there may be a need for an improved push-pull device which can be fabricated more easily.

Such a need may be met with the subject-matter of the independent claims. Advantageous embodiments are defined in the dependent claims.

Ideas underlying embodiments of the present invention may be interpreted as being based, inter alia, on the following observations and recognitions.

An aspect of the invention relates to a push-pull device, comprising: a first waveguide arranged between a first and a second electrode related to the first waveguide; a second waveguide arranged between a first and a second electrode related to the second waveguide; one or more electrically conductive structures extending away from one or more of the electrodes for electrically connecting at least two of the electrodes, the waveguides and the electrodes originating from a pre-fabrication process, the waveguides being poled by a poling originating from a poling process which includes applying an electrical field between at least two of the electrodes, the electrically conductive structures originating: from the pre-fabrication process, wherein one or more of the electrically conductive structures extend to one or more electrically non-conductive gaps, and wherein the device further comprises one or more electrically conductive elements for electrically connecting two of the electrodes, the electrically conductive elements being related to the electrically non-conductive gaps and originating from a post-fabrication process; and/or from a post-fabrication process. Thus, an arrangement of electrodes and waveguides originates from a pre-fabrication process and enables the poling of the waveguides. An arrangement of electrically conductive structures is arranged for electrically connecting at least two of the electrodes for bringing the push-pull device into operation. After the pre-fabrication process, respective electrodes are electrically disconnected for poling. When the electrically conductive structures originate from the pre-fabrication process, electrically non-conductive gaps provide for disconnection of respective electrodes and electrically conductive elements arranged in a post-fabrication process provide for connecting respective electrodes for putting the push-pull device into operation. The electrically conductive structures may originate from a post-processing process for electrically connecting respective electrodes, wherein there is no need to arrange electrically non-conductive gaps. Putting the push-pull device into operation may include connecting a single ended or a differential signal source. The push-pull device is adapted for chip packaging, because access via bonding wires is enabled. The pre-fabrication process may include a process meeting high quality standards for enabling fabrication of the waveguides, wherein the post-fabrication process may include a fabrication process having lower quality standards. For example, the pre-fabrication process may include a lithographic process meeting high quality standards for enabling fabrication of the waveguides, wherein the post-fabrication process may include a lithographic process not requiring the high quality standards of the pre-fabrication process, or a non-lithographic process, such as a bonding process or a printing process only. In particular, the push-pull device can be fabricated more easily, because after poling the waveguides, the device does not have to undergo any further pre-fabrication process steps. The push-pull device originates from a pre-fabrication process, which is followed by a poling process, which is followed by a post-fabrication process. Because the waveguides are poled, in operation of the device one of the waveguides of the push-pull device relates to the denomination "push" and the other of the waveguides relates to the denomination "pull". For example, the waveguides relate to two phase modulators, wherein the phase is pushed in one of the waveguides and pulled in the other one.

In some embodiments, the push-pull device is a plasmonic dual-drive device.

In some embodiments, the push-pull device is a plasmonic push-pull device.

In some embodiments, one of the electrically conductive structures extends away from one of the electrodes to a first electrically non-conductive gap, and another one of the electrically conductive structures extends away from another one of the electrodes to the first electrically non-conductive gap. After pre-fabrication, the device is ready for poling. Post-fabrication includes a simple step of arranging an electrically conductive element at the gap, thereby enabling to put the device into operation by connecting a single ended or a differential signal source to the device.

In some embodiments, one or more of the electrically conductive structures extends away from one of the electrodes to a first electrically non-conductive gap arranged between the first electrically conductive structure and one of the other electrodes. After pre-fabrication, the device is ready for poling. Post-fabrication includes a simple step of arranging an electrically conductive element at the gap, thereby enabling to put the device into operation by connecting a single ended or a differential signal source to the device An electrically conductive structure extending away from an electrode is electrically connected to this electrode.

In some embodiments, one or more of the electrically conductive structures have a lumped design. In particular, the dimensions of the electrically conductive structures are smaller by a factor of more than 10 compared to a radiofrequency wavelength and thereby enable a lumped design having high efficiency.

In some embodiments, the second electrode of the first waveguide and the first electrode of the second waveguide are formed from a single electrode.

In some embodiments, one or more of the at least one electrically conductive element includes an electrically conductive bonding wire, an electrically conductive printed structure, or an electrical switch. The device is adapted for various configurations.

In some embodiments, one or more of the at least one electrically conductive element is arranged at one or more of the at least one electrically non-conductive gap. For example, a bonding wire may be arranged at the electrically non-conductive gap thereby providing a push-pull device originating from a simple fabrication process.

In some embodiments, the pre-fabrication process includes a lithographic process falling above a pre-defined quality level and the post-fabrication process includes a lithographic process falling below the pre-defined quality level and/or a non-lithographic process. The pre-defined quality level may relate to a precision, such as defined in nanometers, as regards width and/or length of the waveguides or electrodes, for example. The pre-defined quality level enables fabrication of waveguides which use the plasmonic effect, for example, and requires a highly complex fabrication process, wherein a lithographic process of a lower complexity or no lithographic process is required for arrangement of electrically conductive elements and/or fabrication of the electrically conductive structures.

In some embodiments, the waveguides extend essentially along a line or along a ring. A push-pull device is provided which can be designed for various purposes and applications.

In some embodiments, the device is configured as one or more of: a plasmonic-organic hybrid device, a plasmonic device, a ferroelectric device, a silicon-organic hybrid electro-optical device, an organic modulator device, a dielectric-organic hybrid device, a transmitter, a phase modulator, a ring modulator, a racetrack modulator, a resonant modulator, a Mach-Zehnder modulator, and an in-phase/quadrature-phase modulator.

A method for fabricating a push-pull device comprises: a pre-fabrication process, which includes: arranging a first waveguide between a first and a second electrode related to the first waveguide; arranging a second waveguide between a first and a second electrode related to the second waveguide; optionally arranging one or more electrically conductive structures which extend away from one or more of the electrodes to at least one electrically non-conductive gap. The method further comprises a poling process, which includes applying an electrical field between at least two of the electrodes. The method further comprises a post-fabrication process, which includes in case of optionally arranged conductive structures during the pre-fabrication process, arranging at least one electrically conductive element related to the at least one electrically non-conductive gap for electrically connecting two of the electrodes and/or arranging one or more electrically conductive structures for electrically connecting at least two of the electrodes.

In some embodiments, the pre-fabrication process includes arranging one of the electrically conductive structures extending away from one of the electrodes to a first electrically non-conductive gap, and another one of the electrically conductive structures extending away from another one of the electrodes to the first electrically non-conductive gap.

In some embodiments, the pre-fabrication process includes arranging one or more of the electrically conductive structures extending away from one of the electrodes to a first electrically non-conductive gap arranged between the first electrically conductive structure and one of the other electrodes.

In some embodiments, the pre-fabrication process includes arranging one or more of the electrically conductive structures having a lumped design.

In some embodiments, the post-fabrication process includes arranging one or more of the at least one electrically conductive element at one or more of the at least one electrically non-conductive gap.

In some embodiments, the pre-fabrication process includes a lithographic process falling above a pre-defined quality level and the post-fabrication process includes a lithographic process falling below the pre-defined quality level and/or a non-lithographic process.

BRIEF DESCRIPTION OF THE DRAWINGS

In the following, advantageous embodiments of the invention will be described with reference to the enclosed drawings. However, neither the drawings nor the description shall be interpreted as limiting the invention.

FIG. 2' schematically illustrates a push-pull device having poled waveguides originating from a poling process.

FIG. 3' schematically illustrates the push-pull device of FIG. 2' having electrically conductive structure originating from a post-fabrication process.

The figures are only schematic and not to scale. Same reference signs refer to same or similar features. Same schematic elements refer to same or similar features.

MODE(S) FOR CARRYING OUT THE INVENTION

Figure 1:
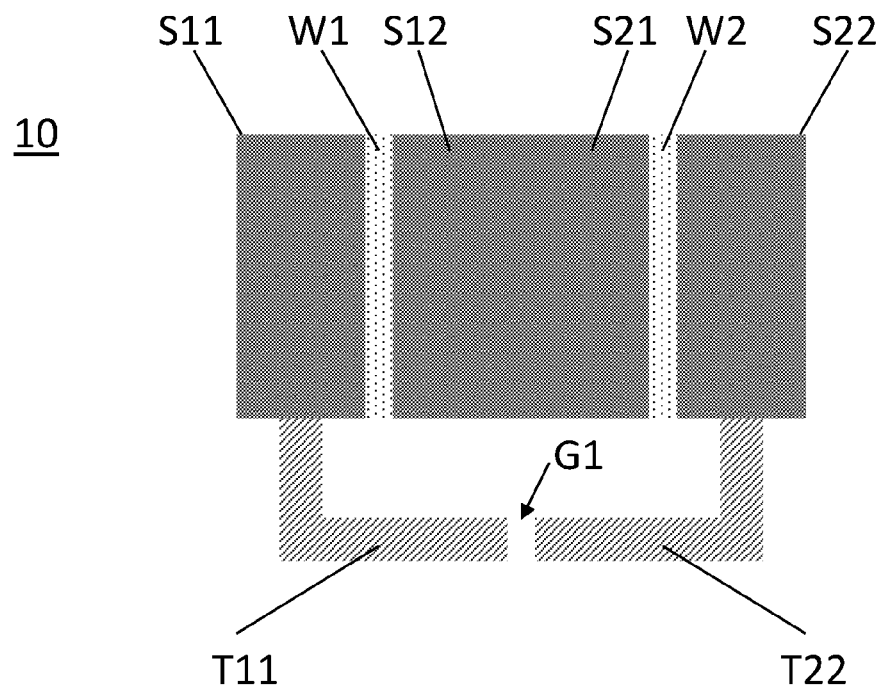
FIG. 1 schematically illustrates elements of an embodiment of a push-pull device originating from a pre-fabrication process.

FIG. 1 schematically illustrates waveguides W1, W2, electrodes S11, S12, S21, S22 and electrically conductive structures T11, T22 of a push-pull device 10. The waveguides W1, W2, the electrodes S11, S12, S21, S22 and the electrically conductive structures T11, T22 originate from a pre-fabrication process. In other embodiments not illustrated in FIG. 1, the waveguides W1, W2 and the electrodes S11, S12, S21, S22 originate from a pre-fabrication process, whereas the electrically conductive structures T11, T22 originate from a post-fabrication process.

A first waveguide W1 is arranged between a first and a second electrode S11, S22 related to the first waveguide W1. A second waveguide W2 is arranged between a first and a second electrode S21, S22 related to the second waveguide W2. The waveguides W1, W2 essentially extend along respective lines arranged essentially parallel to each other. Accordingly, the waveguides W1, W2 and electrodes S11, S12, S21, S22 are arranged in a direction perpendicular to these lines. As illustrated in FIG. 1, the second electrode S12 of the first waveguide W1 and the first electrode S21 of the second waveguide W2 may be formed from a single electrode. A first electrically conductive structure T11 extends away from the first electrode S11 of the first waveguide W1 to an electrically non-conductive gap G1. A second electrically conductive structure T22 extends away from the second electrode S22 of the second waveguide W2 to the electrically non-conductive gap G1. The electrically conductive structures T11, T22 abut the respective electrodes S11, S22 and are electrically connected to the respective electrodes S11, S22.

Figure 2:
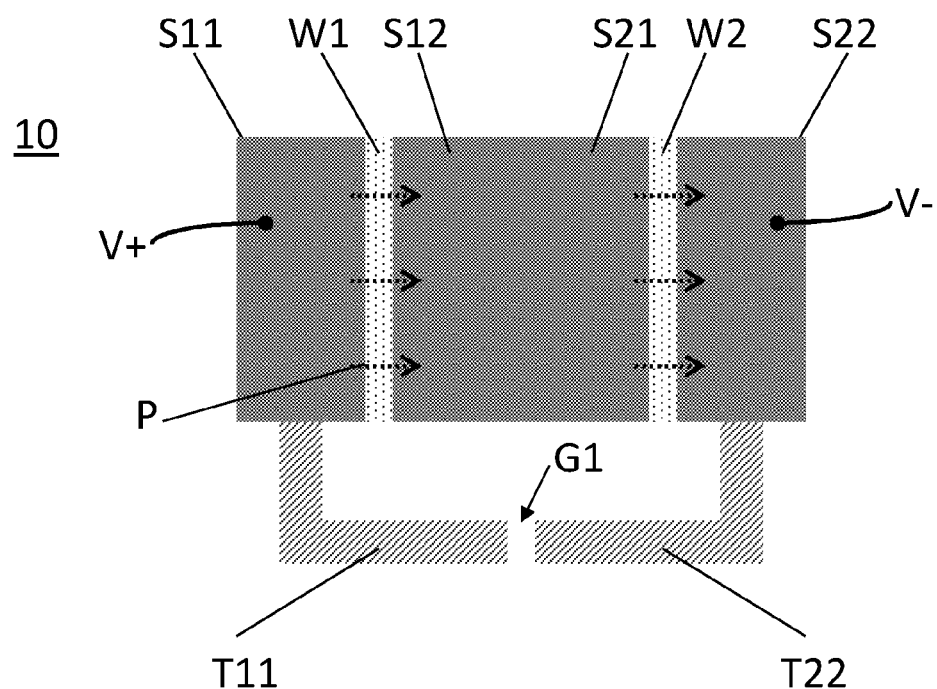
FIG. 2 schematically illustrates the push-pull device of FIG. 1 having poled waveguides originating from a poling process.
Figure 2:
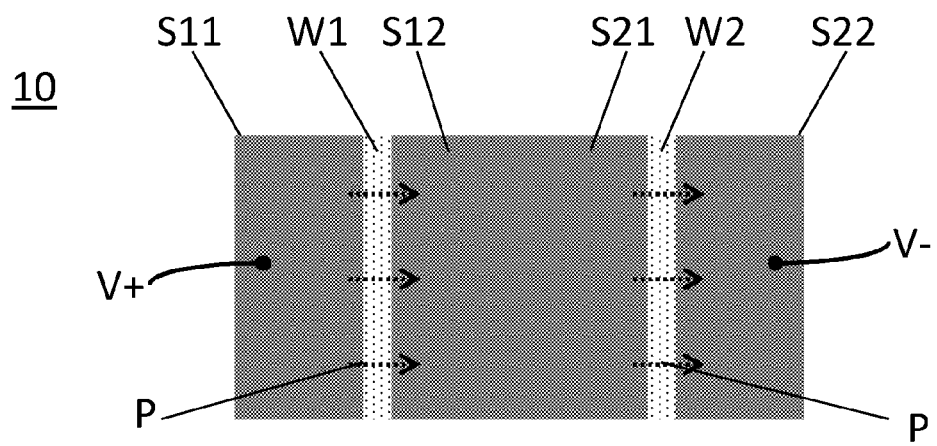

FIG. 2 schematically illustrates the first waveguide W1 and the second waveguide W2 of the push-pull device 10 being poled by a poling P originating from a poling process which includes applying an electrical field between at least two of the electrodes S11, S12, S21, S22. As illustrated in FIG. 2, applying an electrical field between at least two of the electrodes S11, S12, S21, S22 includes connecting a positive voltage V+ to the first electrode S11 of the first waveguide W1 and a negative voltage V− to the second electrode S22 of the second waveguide W2. As illustrated in FIG. 2, the direction of the poling P is in the same direction in the first waveguide W1 and in the second waveguide W2.

Figure 3:
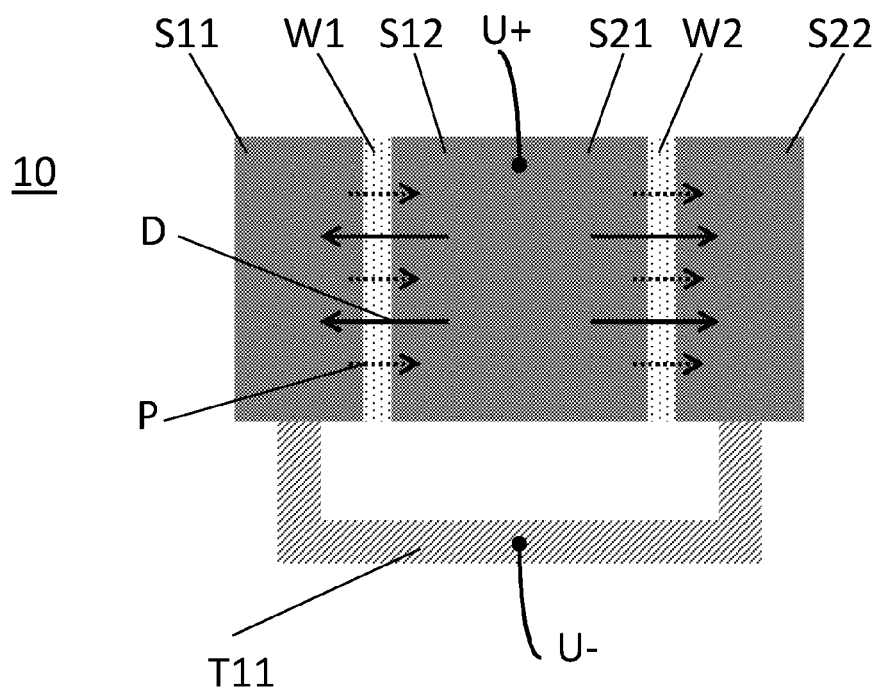
FIG. 3 schematically illustrates the push-pull device of FIG. 3 having elements originating from a post-fabrication process.
Figure 3:
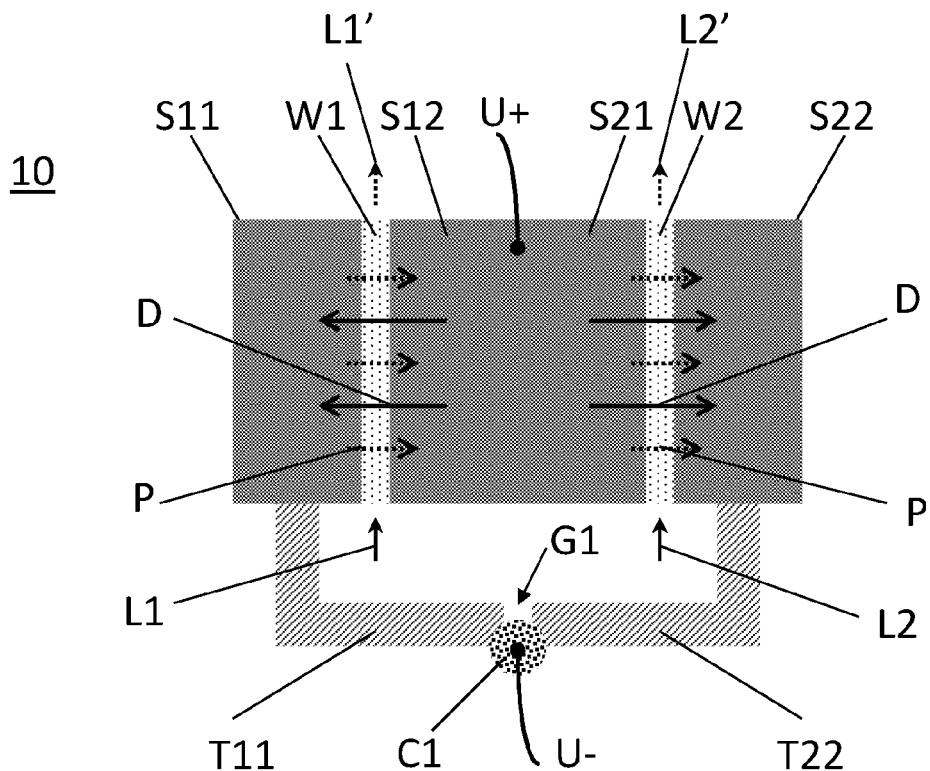

FIG. 3 illustrates schematically an electrically conductive element C1 being arranged at the electrically non-conductive gap G1 for electrically connecting the first electrode S11 of the first waveguide W1 and the second electrode S22 of the second waveguide W2, in particular via the first electrically conductive structure T11 of the first waveguide W1 and the second electrically conductive structure T22 of the second waveguide W2. As illustrated in FIG. 3, a driving voltage U+, U− may be connected to the electrically conductive element C1 and the electrodes S12, S21 for generating a driving field D in the waveguides W1, W2. The electrically conductive element C1 originates from a post-processing process. In other embodiments not illustrated in FIG. 3, the driving voltage U+, U− may be connected to the electrodes S11, S22 or the electrically conductive structures T11, T22 and the electrodes S12, S21 for generating a driving field D in the waveguides W1, W2.

The electrically non-conductive gap G1 enables the poling P of the first waveguide W1 and of the second waveguide W2, and the electrically conductive element C1 arranged at the electrically non-conductive gap G1 enables applying a driving field D to the first waveguide W1 and to the second waveguide W2 by connecting a driving voltage U+, U−, such as a single-ended signal or differential signal, to the electrodes S12, S21 and the electrically conductive element C1, for example. The direction of the poling P is the same in both waveguides W1, W2, wherein the direction of the driving field D in the first waveguide W1 is opposite to the driving field D in the second waveguide W2. Optical signals L1, L2 may be coupled into the waveguides W1, W2 at one end, and modified optical signals L1', L2' may be received from the waveguides W1, W2 at the other end, wherein the modified optical signals L1', L2' are modified in accordance to the driving field D generated by the driving voltage U+, U− in the respective waveguides W1, W2. The plasmonic 10 device is adapted for chip packaging. The push-pull device 10 can be fabricated more easily.

In accordance to the invention, the waveguides W1, W2, the electrodes S11, S12, S21, S22, and the electrically conductive structures T11, T22 originate from a pre-fabrication process, and the electrically conductive element C1 originates from a post-fabrication process. In particular, the pre-fabrication process requires high precision, wherein the precision requirements of the poling process and the post-fabrication process is less demanding. The push-pull device 10 can be fabricated in a sequence of three fabrication processes. After the poling process there is no need to bring back the push-pull device 10 to a fabrication process which requires high precision for enabling connection of a driving voltage U+, U− to the push-pull device 10. Merely by arranging the electrically conductive element C1 in a post-fabrication process, it is enabled that the push-pull device 10 can be put into operation by connecting a driving voltage U+, U−.

Figure 4:
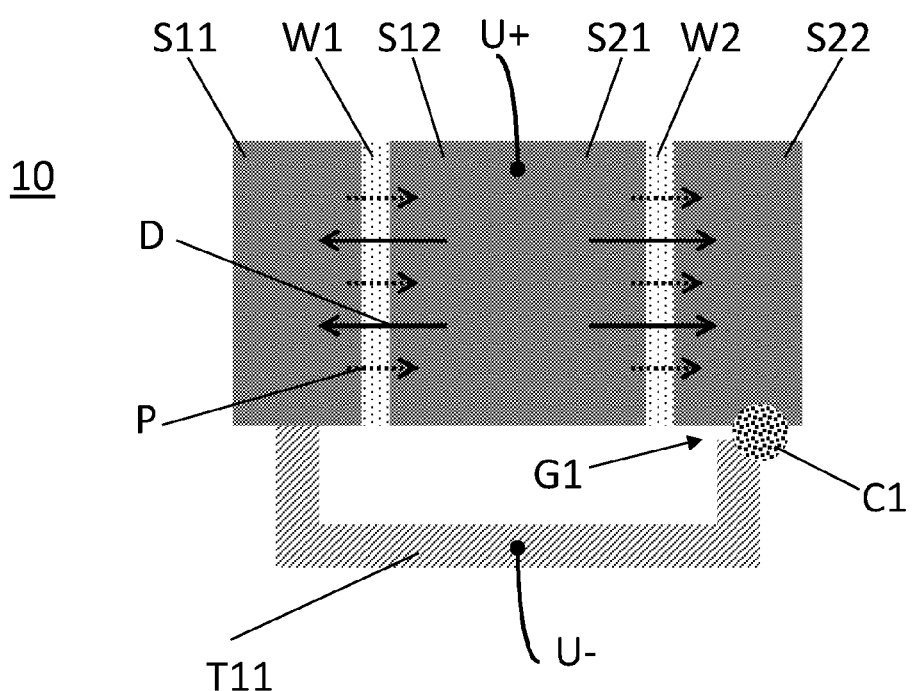
FIGS. 4-7 schematically illustrate embodiments of push-pull devices originating from a pre-fabrication process, a poling process and a post-fabrication process.

FIG. 4 illustrates schematically an embodiment of a push-pull device 10. The first electrically conductive structure T11 of the first waveguide W1 extends away from the first electrode S11 of the first waveguide W1 to an electrically non-conductive gap G1 arranged between the first electrically conductive structure T11 and the second electrode S22 of the second waveguide W2. After poling P of the waveguides W1, W2, the electrically conductive element C1 is arranged at the electrically non-conductive gap G1 for electrically connecting the first electrode S11 of the first waveguide W1 and the second electrode S22 of the second waveguide W2, in particular via the first electrically conductive structure T11. The push-pull device 10 can be put into operation by connecting a driving voltage U+, U− to the electrodes S12, S21 and the first electrically conductive structure T11, for example.

FIG. 2' illustrates schematically an embodiment of a push-pull device 10. A first waveguide W1 is arranged between a first and second electrode S11, S12 related to the first waveguide W1. A second waveguide W2 is arranged between a first and a second electrode S21, S22 related to the second waveguide W2. The waveguides W1, W2 and the electrodes S11, S12, S21, S22 originate from a pre-fabrication process. The waveguides W1, W2 are poled by a poling P originating from a poling process which includes applying an electrical field between at least two of the electrodes S11, S12, S21, S22. As illustrated in FIG. 2', applying an electrical field between at least two of the electrodes S11, S12, S21, S22 includes connecting a positive voltage V+ to the first electrode S11 of the first waveguide W1 and a negative voltage V− to the second electrode S22 of the second waveguide W2. As illustrated in FIG. 2, the direction of the poling P is in the same direction in the first waveguide W1 and in the second waveguide W2.

FIG. 3' illustrates schematically an electrically conductive structure T11 being arranged for electrically connecting the first electrode S11 of the first waveguide W1 and the second electrode S22 of the second waveguide W2. The electrically conductive structure T11 originates from a post-fabrication process. As illustrated in FIG. 3', a driving voltage U+, U− may be connected to the electrically conductive structure T11 and the electrodes S12, S21 for generating a driving field D in the waveguides W1, W2.

Figure 5:
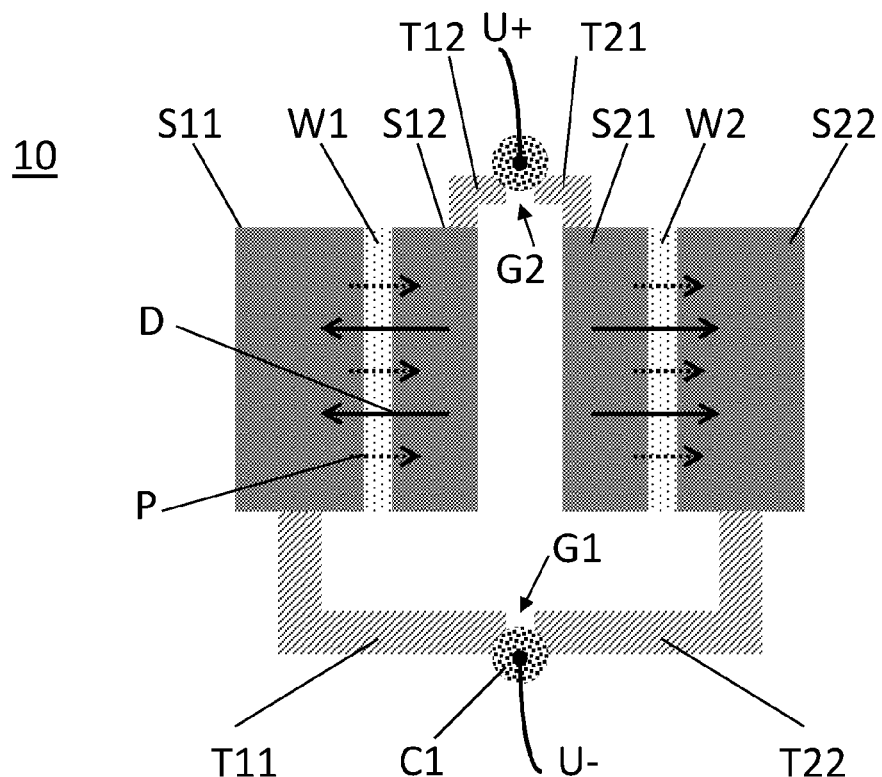

FIG. 5 illustrates schematically an embodiment of a push-pull device 10. The second electrode S12 of the first waveguide W1 is arranged separated from the first electrode S21 of the second waveguide W2. A first electrically conductive structure T11 of the first waveguide W1 extends away from the first electrode S11 of the first waveguide W1 to a first electrically non-conductive gap G1. A second electrically conductive structure T22 of the second waveguide W2 extends away from the second electrode S22 of the second waveguide W2 to the first electrically non-conductive gap G1. Analogously, a second electrically conductive structure T12 of the first waveguide W1, a first electrically conductive structure T21 of the second waveguide W2, and a second electrically non-conductive gap G2 are arranged. Poling P may originate, for example, from applying an electrical field between the first and the second electrode S11, S12 of the first waveguide W1, and by applying an electrical field between the first and second electrode S21, S22, of the second waveguide W2. A first electrically conductive element C1 is arranged at the electrically non-conductive gap G1 for electrically connecting the first electrode S11 of the first waveguide W1 and the second electrode S22 of the second waveguide W2, in particular via the first electrically conductive structure T11 of the first waveguide W1 and the second electrically conductive structure T22 of the second waveguide W2. A second electrically conductive element C2 is arranged at the second electrically non-conductive gap G2 for electrically connecting the second electrode S12 of the first waveguide W1 and the first electrode S21 of the second waveguide W2, in particular via the second electrically conductive structure T12 of the first waveguide W1 and the first electrically conductive structure T21 of the second waveguide W2. The push-pull device 10 can be put into operation by connecting a driving voltage U+, U− to the first and the second electrically conductive element C1, C2, for example.

Figure 6:
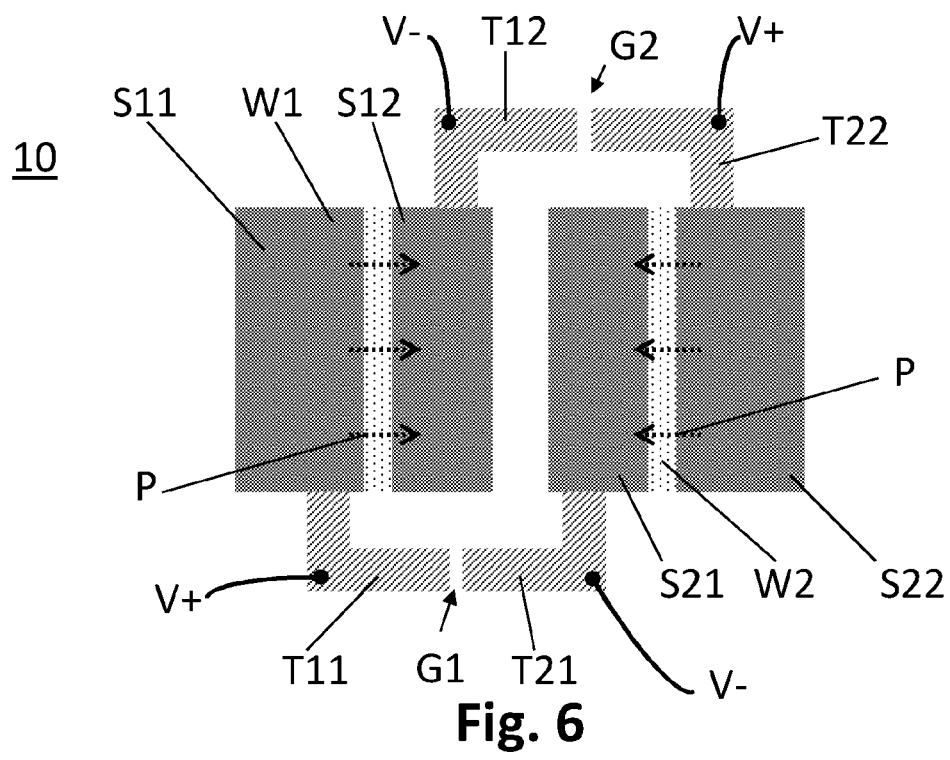

FIG. 6 illustrates schematically an embodiment of a push-pull device 10. The second electrode S12 of the first waveguide W1 is arranged separated from the first electrode S21 of the second waveguide W2. A first electrically conductive structure T11 of the first waveguide W1 extends away from the first electrode S11 of the first waveguide W1 to a first electrically non-conductive gap G1. A first electrically conductive structure T21 of the second waveguide W2 extends away from the first electrode S21 of the second waveguide W2 to the first electrically non-conductive gap G1. Analogously, a second electrically conductive structure T12 of the first waveguide W1, a second electrically conductive structure T22 of the second waveguide W2, and a second electrically non-conductive gap G2 are arranged. As illustrated in FIG. 6, poling P originates from applying an electrical field between the first electrodes S11, S21 of the first and second waveguides W1, W2, and by applying an electrical field between the second electrodes S12, S22, of the first and second waveguides W1, W2. As illustrated in FIG. 6, a positive voltage V+ is connected to the first electrically conductive structure T11 of the first waveguide W1 and a negative voltage V− is connected to the first electrically conductive structure T21 of the second waveguide W2. As illustrated in FIG. 6, the positive voltage V+ is connected to the second electrically conductive structure T22 of the second waveguide W2 and the negative voltage V− is connected to the second electrically conductive structure T12 of the first waveguide W1. Accordingly, the direction of the poling P is in one direction in the first waveguide W1 and in the opposite direction in the second waveguide W2.

Figure 7:
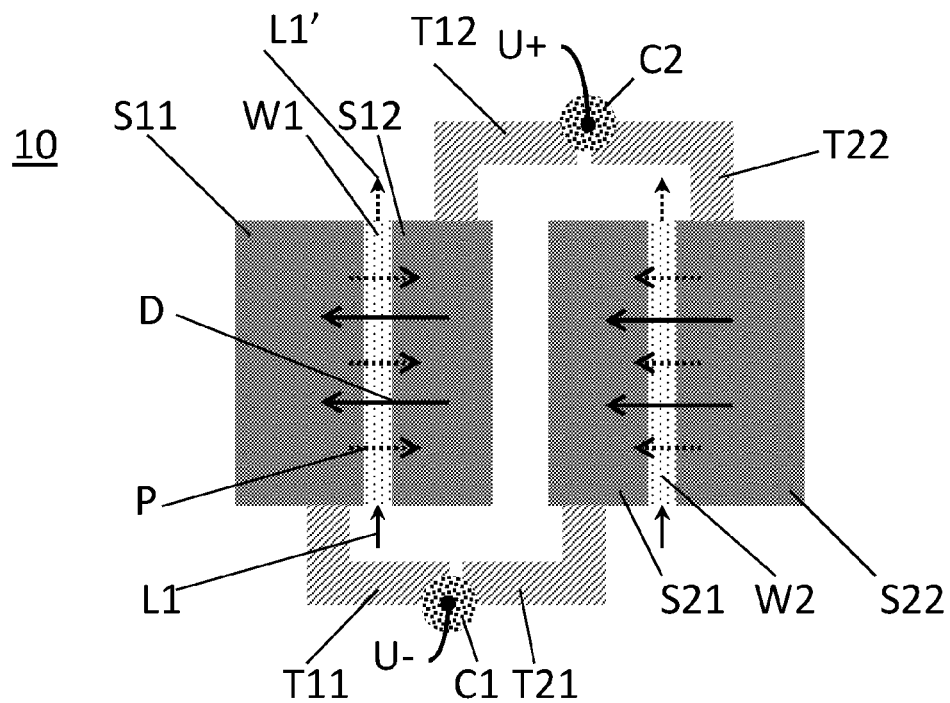

FIG. 7 illustrates the embodiment of a push-pull device 10 in accordance with FIG. 6, wherein a first electrically conductive element C1 is arranged at the electrically non-conductive gap G1 for electrically connecting the first electrode S11 of the first waveguide W1 and the first electrode S21 of the second waveguide W2, in particular via the first electrically conductive structure T11 of the first waveguide W1 and the first electrically conductive structure T21 of the second waveguide W2. A second electrically conductive element C2 is arranged at the second electrically non-conductive gap G2 for electrically connecting the second electrode S12 of the first waveguide W1 and the second electrode S22 of the second waveguide W2, in particular via the second electrically conductive structure T12 of the first waveguide W1 and the second electrically conductive structure T22 of the second waveguide W2. The push-pull device 10 can be put into operation by connecting a driving voltage U+, U− to the first and the second electrically conductive element C1, C2, for example.

Figure 8:
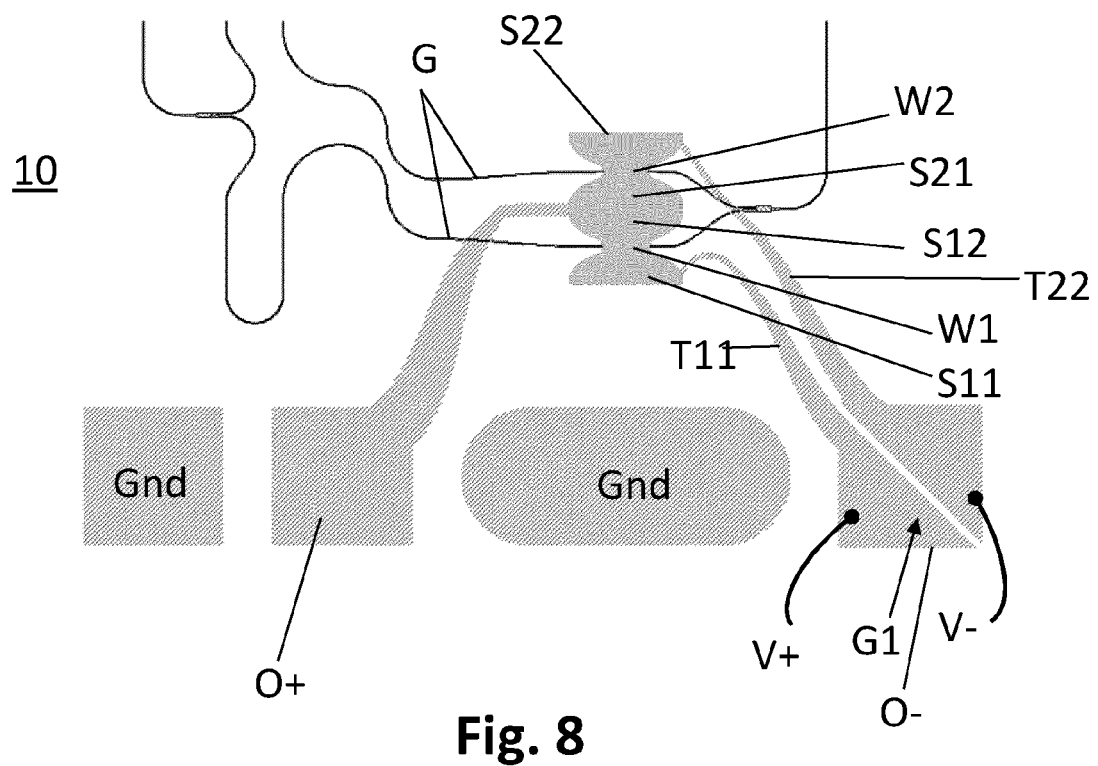
FIG. 8 schematically illustrates elements of an embodiment of a push-pull device originating from a pre-fabrication process and having poled waveguides origination from a poling process.

FIG. 8 illustrates schematically an embodiment of a push-pull device 10. Illustrated are elements of the push-pull device 10 as arranged on an integrated chip. The push-pull device 10 includes waveguides W1, W2, electrodes S11, S12, S21, S22 electrically conductive structures T11, T22, and an electrically non-conductive gap G1 originating from a pre-fabrication process. The push-pull device 10 illustrated in FIG. 8 corresponds to the push-pull device 10 illustrated in FIG. 2. As illustrated in FIG. 8, at the location of the electrically non-conductive gap G1, the electrically conductive structures T11, T22 extend into a form of a bonding pad, in particular a negative signal bonding pad O−. Furthermore, other bonding pads are arranged, in particular ground pad Gnd and a positive signal bonding pad 0+, which is connected via an electrically conductive structure to the electrodes S12, S21. As illustrated in FIG. 8, poling of the waveguides W1, W2 is provided by connecting voltages V+, V− to the electrically conductive structures T11, T22 at the location of the negative signal bonding pads O−.

Figure 9:
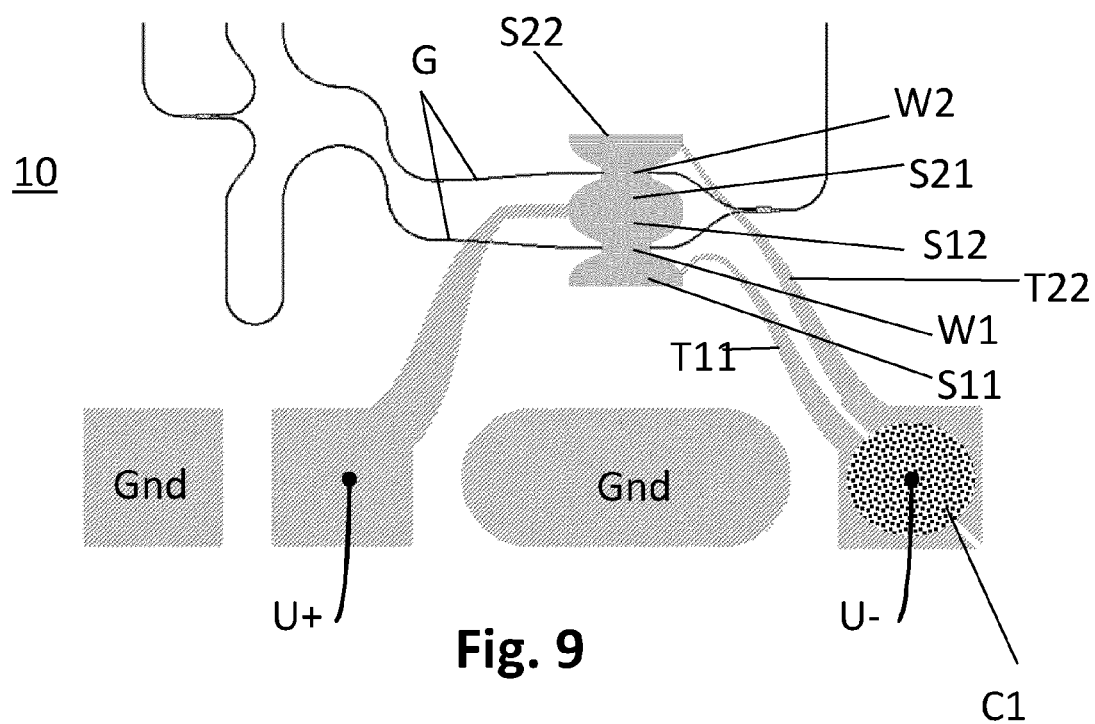
FIG. 9 schematically illustrates the push-pull device of FIG. 8 having elements originating from a post-fabrication process.

FIG. 9 illustrates the embodiment of a push-pull device 10 in accordance with FIG. 8, wherein a first electrically conductive element C1 is arranged at the electrically non-conductive gap G1 for electrically connecting the first electrode S11 of the first waveguide W1 and the second electrode S22 of the second waveguide W2, in particular via the first electrically conductive structure T11 of the first waveguide W1 and the second electrically conductive structure T22 of the second waveguide W2. The push-pull device 10 can be put into operation by connecting a driving voltage U+, U− to the positive bonding pad O+ and to the electrically conductive element C1, for example.

Figure 10:
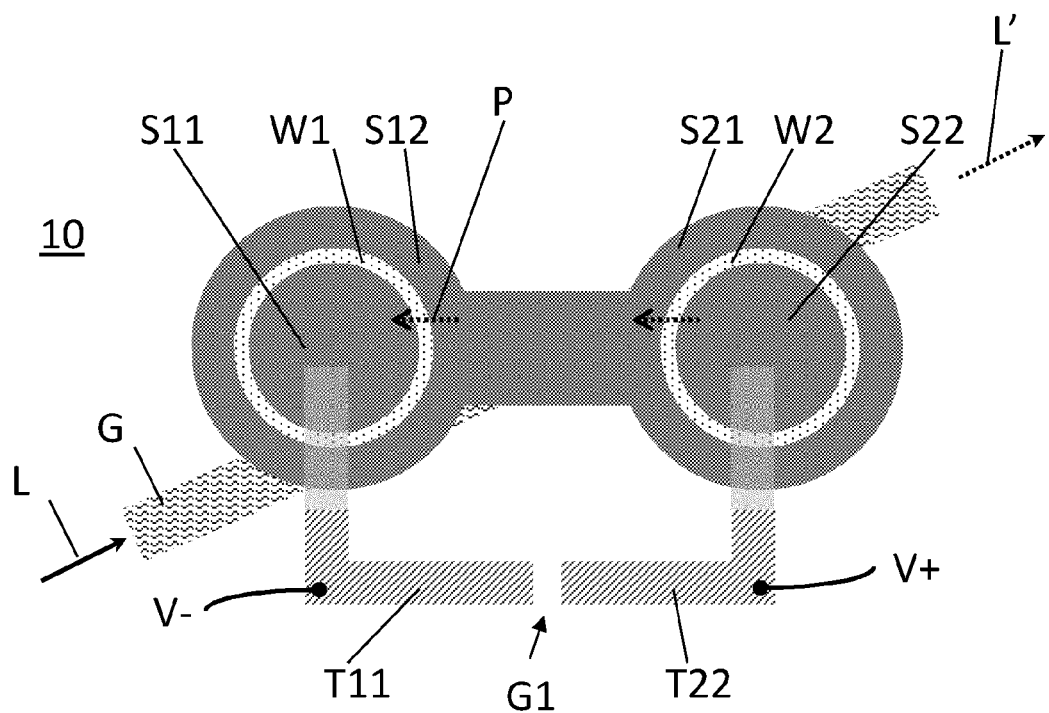
FIG. 10 schematically illustrates elements of an embodiment of a push-pull device having a ring design originating from a pre-fabrication process and having poled waveguides origination from a poling process.

FIG. 10 illustrates schematically an embodiment of a push-pull device 10, which includes a first waveguide W1 arranged between a first and a second electrode S11, S12 related to the first waveguide W1 and a second waveguide W2 arranged between a first and a second electrode S21, S22 related to the second waveguide W2. The waveguides W1, W2 have a ring/racetrack design. Accordingly, each of the waveguides W1, W2 and the respective electrodes S11, S12, S21, S22 are arranged concentrically. The second electrode S12 of the first waveguide W1 and the first electrode S21 of the second waveguide W2 are connected to each other by respectively arranged electrode parts, for example a rectangular electrode part as illustrated in FIG. 10. A first electrically conductive structure T11 extends away from the first electrode S11 of the first waveguide W1 to an electrically non-conductive gap G1. A second electrically conductive structure T22 extends away from the second electrode S22 of the second waveguide W2 to the electrically non-conductive gap G1. The conductive structures T11, T22 are arranged at a distance from the respective electrodes S11, S22, in particular because the respective electrodes S11, S22 are arranged inside the waveguides W1, W2 and the respective other electrodes S12, S21. The waveguides W1, W2, the electrodes S11, S12, S21, S22 and the electrically conductive structures T11, T22 originate from a pre-fabrication process.

The push-pull device 10 illustrated in FIG. 10 includes two resonant plasmonic waveguides W1, W2 which are connected by a feeding photonic waveguide G which also acts as in- and output to the push-pull device 10. The resonant plasmonic waveguides W1, W2 have a ring/racetrack design. The photonic waveguide G interfaces the waveguides W1, W2 and may be arranged below or above the waveguides W1, W2 for coupling an optical signal to/from the resonant structure.

As illustrated in FIG. 10, a photonic waveguide G is arranged, which extends in a diagonal direction between the first waveguide W1 and the second waveguide W2. The photonic waveguide G enables receiving an optical signal L at one end and transmitting a modulated optical signal L' at the other end.

As illustrated in FIG. 10, the electrically conductive structures T11, T22 are connected with the respective electrodes S11, S22. This connection may be arranged above or below the layer with the waveguides W1, W2 and/or the electrodes S11, S12, S21, S21.

As illustrated in FIG. 10, the waveguides W1, W2 are poled by a poling P originating from a poling process which includes applying an electrical field between at least two of the electrodes S11, S12, S21, S22. As illustrated in FIG. 10, applying an electrical field between at least two of the electrodes S11, S12, S21, S22 includes connecting voltages V+, V− to the electrically conductive structures T11, T22.

Figure 11:
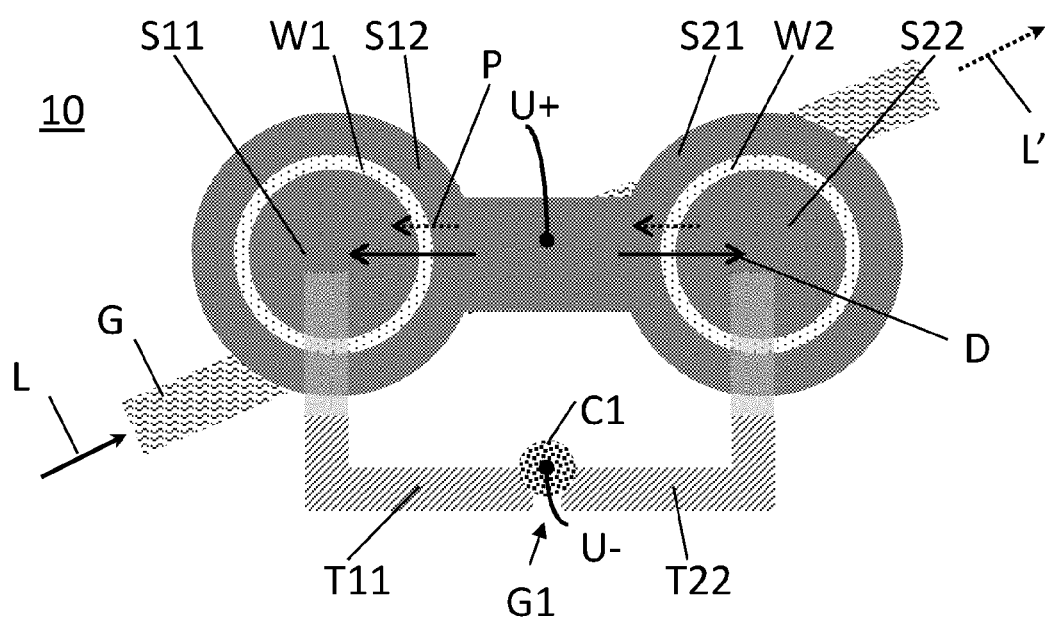
FIG. 11 schematically illustrates the push-pull device of FIG. 10 having elements originating from a post-fabrication process.

FIG. 11 illustrates schematically an electrically conductive element C1 being arranged at the electrically non-conductive gap G1 for electrically connecting the first electrode S11 of the first waveguide W1 and the second electrode S22 of the second waveguide W2, in particular via the first electrically conductive structure T11 of the first waveguide W1 and the second electrically conductive structure T22 of the second waveguide W2. As illustrated in FIG. 11, a driving voltage U+, U− may be connected to the electrically conductive element C1 and the electrodes S12, S21 for generating a driving field D in the waveguides W1, W2. The electrically conductive element C1 originates from a post-processing process.

Figure 12:
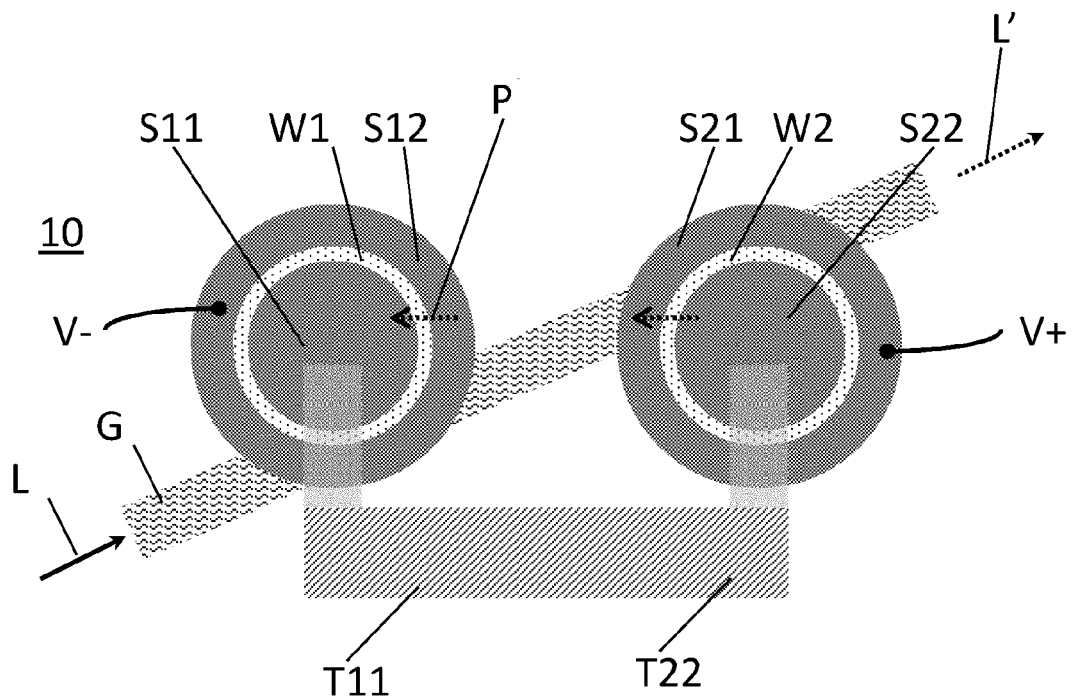
FIG. 12 schematically illustrates elements of an embodiment of a push-pull device having a ring design originating from a pre-fabrication process and having poled waveguides origination from a poling process.
Figure 13:
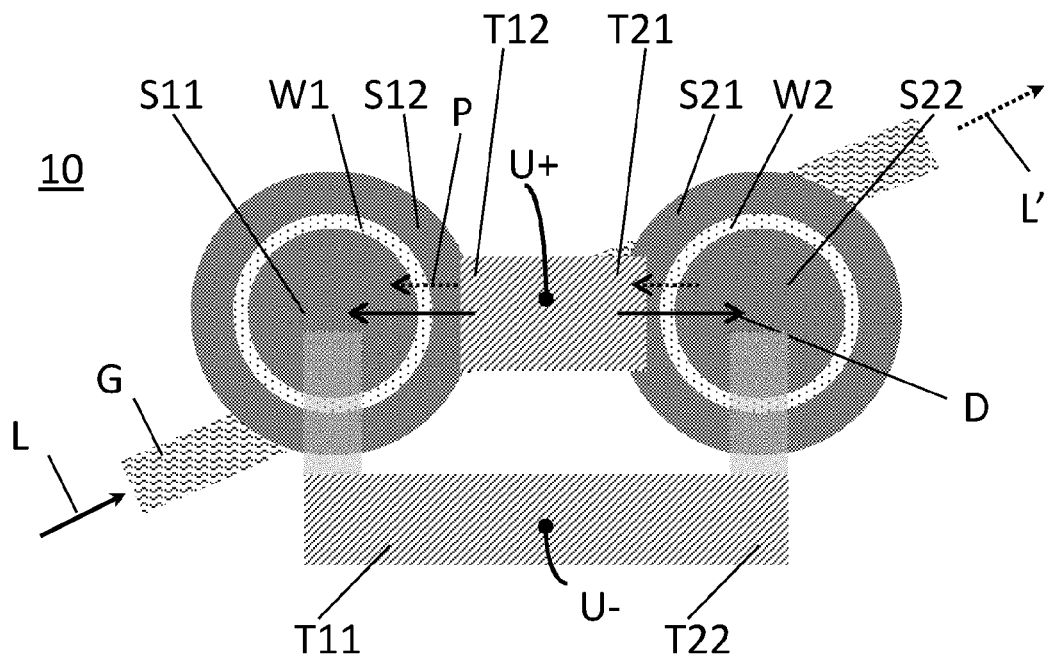
FIG. 13 schematically illustrates the push-pull device of FIG. 12 having elements originating from a post-fabrication process.

FIGS. 12, 13 illustrate schematically an embodiment of a push-pull device 10 having similar features as the push-pull device 10 illustrated in FIGS. 10, 11. The second electrode S12 of the first waveguide W1 and the first electrode S21 of the second waveguide W2 are arranged separated by a distance from each other. Thus, the electrodes S12, S22 are electrically disconnected. The electrically conductive structures T11, T22 extend from the electrodes S12, S22 and are arranged without a gap, for example in the form of a single electrically conductive structure. The waveguides W1, W2 and the electrodes S11, S12, S21, S22 originate from a pre-fabrication process, as well as, for example, the electrically conductive structures T11, T22. The waveguides W1, W2 are poled by a poling P originating from a poling process which includes applying an electrical field between at least two of the electrodes S11, S12, S21, S22. As illustrated in FIG. 12, applying an electrical field between at least two of the electrodes S11, S12, S21, S22 includes connecting voltages V+, V− to the electrodes S11, S22. As illustrated in FIG. 13, electrically conductive structures T21, T22 are arranged for connecting the electrodes S12, S21. The electrically conductive structures T21, T22 originate, for example, from a post-fabrication process. The push-pull device 10 can be put into operation by connecting a driving voltage U+, U− to the electrically conductive structures T11, T22 and the electrically conductive structures T21, T22, for example.

Figure 14:
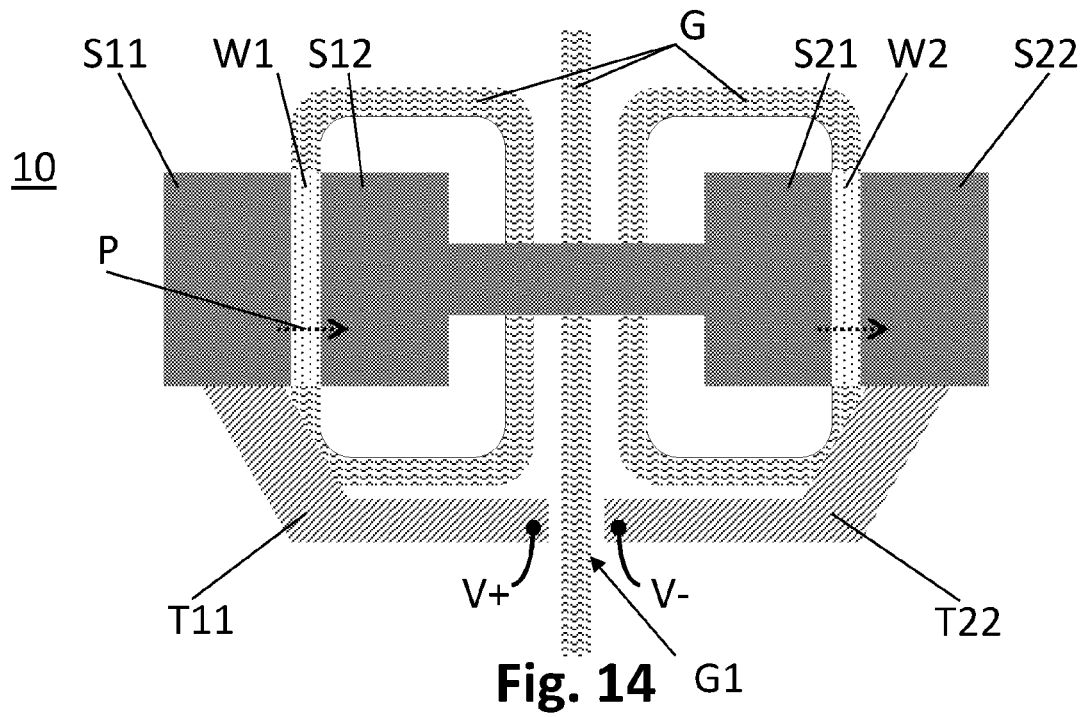
FIG. 14 schematically illustrates elements of an embodiment of a push-pull device having a waveguides extending along a line and having multiple photonic waveguides originating from a pre-fabrication process and having poled waveguides origination from a poling process.
Figure 15:
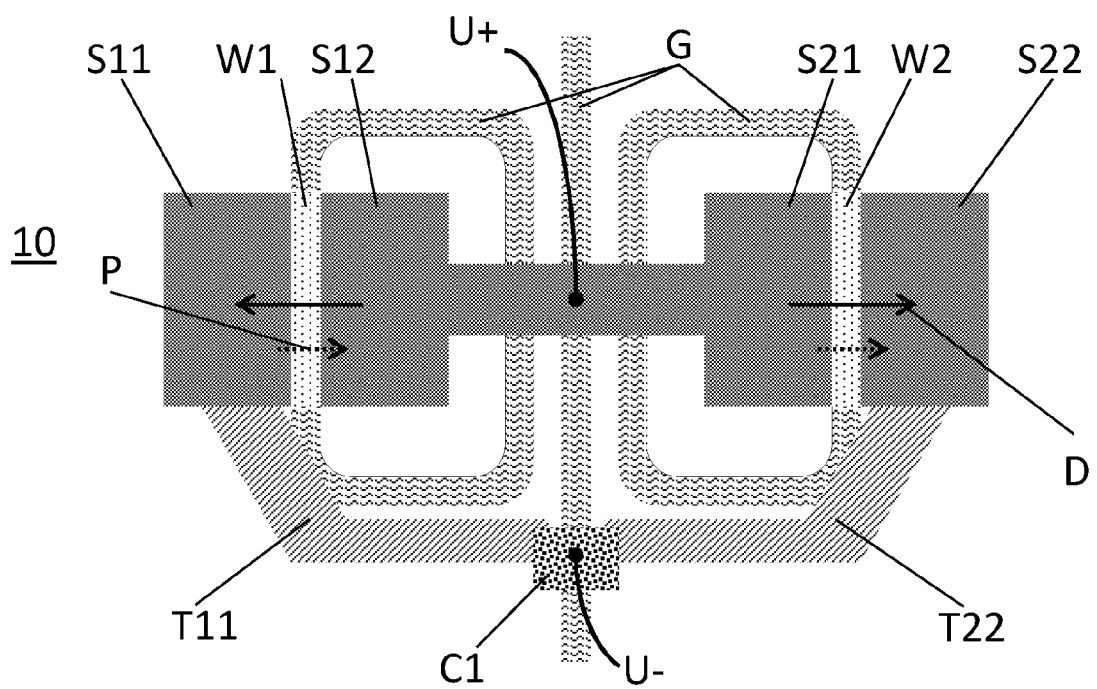
FIG. 15 schematically illustrates the push-pull device of FIG. 14 having elements originating from a post-fabrication process.

FIGS. 14, 15 illustrate schematically an embodiment of a push-pull device 10 having similar features as the push-pull device 10 illustrated in FIGS. 1-3. The push-pull device 10 illustrated in FIGS. 14, 15 is a resonant device. Arranged are photonic waveguides G, wherein a linear photonic waveguide G is arranged, in the illustrated embodiment, essentially on the symmetry axis of the push-pull device 10, and on each side of the symmetry axis a photonic waveguide having a ring/racetrack design is arranged, which have sections which coincide with the waveguides W1, W2. Other embodiments of the push-pull device 10 may have arranged waveguides G in different configurations.

Figure 16A:
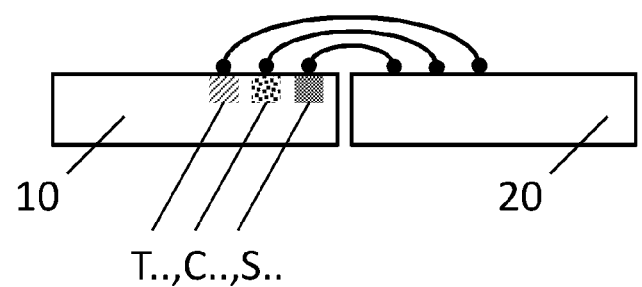
FIGS. 16A, 16B, 16C schematically illustrate a cross-section view of possible configurations of a push-pull device 10 connected with a chip device 20.
Figure 16B:
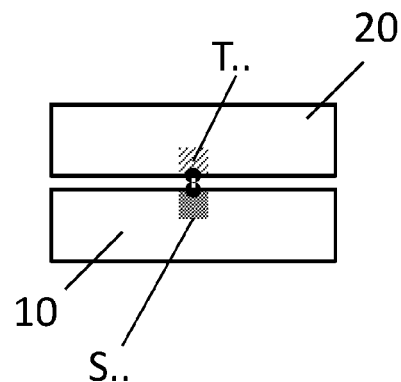
Figure 16C:
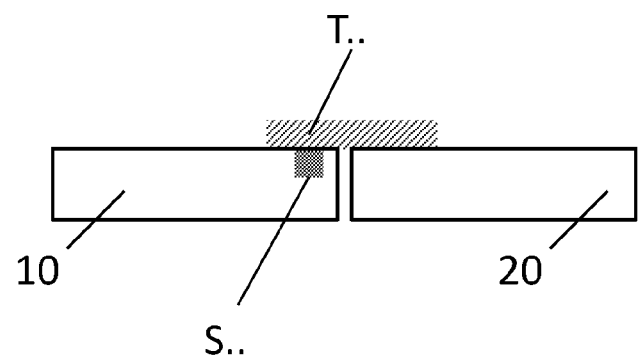

FIGS. 16A, 16B, 16C illustrate schematically a cross-section view of possible configurations of a push-pull device 10 connected with a chip device 20. The chip device 20 may relate to an electronic chip, an interposer, or a signal source, for example. Exemplary electrical connections between the push-pull device 10 and the chip device 20 are illustrated with lines or curves having bullets at their ends, which are not limiting the number of connections, physical features of the connections, etc.

FIG. 16A illustrates contacting, in a post-fabrication process, the chip device 20 with electrodes S . . . , electrically conductive structures T . . . and/or contact elements C . . . arranged on the push-pull device 10 having waveguides W1, W2 and originating from a pre-fabrication process, a poling process and a post-fabrication process.

FIG. 16B illustrates contacting, in a post-fabrication process, for example a wafer-bonding process, a ball bonding process, etc., electrically conductive structures T . . . arranged on the chip device 20 with electrodes S . . . arranged on the push-pull device 10 having waveguides W1, W2 and originating from a pre-fabrication process and a poling process.

FIG. 16C illustrates arranging, in a post-fabrication process, for example including bonds, printed structures, etc., electrically conductive structures T . . . for contacting the chip device 20 with electrodes S . . . arranged on the push-pull device 10 having waveguides W1, W2 and originating from a pre-fabrication process and a poling process.

FIGS. 1-9 illustrate embodiments of push-pull devices having a linear design, wherein the waveguides W1, W2 essentially extend along a line.

FIGS. 10-13 illustrate embodiments of push-pull devices having a ring/racetrack design, wherein the waveguides W1, W2 essentially extend along a ring, further including a photonic waveguide G having a linear design. Other embodiments of the push-pull device may have a photonic waveguide G of a different design, for example including curvatures, etc.

FIGS. 14-15 illustrate embodiments of push-pull devices having waveguides W1, W2 which essentially extend along a line, further including photonic waveguides essentially extending along a line and along rings/racetracks.

FIGS. 2', 3' illustrates an embodiment of a push-pull device analogous to the push-pull device illustrated in FIGS. 2, 3, wherein the electrically conductive structure T11 originates from a post-fabrication process. Analogously, the push-pull devices illustrated in FIGS. 1-15 may include electrically conductive structures T11, T12, T21, T22 originating from a post-fabrication process.

The push-pull device 10 according to the present disclosure may include electrodes S11, S12, S21, S22 with one or more metal layers comprising or consisting of Gold (Au), Silver (Ag), Copper (Cu), Aluminium (Al), or Titanium (Ti), Chromium (Cr), or an alloy thereof. In some embodiments, a high permittivity material, such as BaTiO3, may be arranged, for example between the waveguides W1, W2 and the electrodes S11, S12, S21, S22, for providing a capacitive coupling.

The push-pull device 10 according to the present disclosure may include waveguides W1, W2 with a dielectric layer, a semiconductor, an insulating material, etc. In some embodiments, the waveguides W1, W2 make use of the plasmonic effect. In some embodiments, the waveguides W1, W2 are silicon-organic hybrid waveguides. In some embodiments, the waveguides W1, W2 are all-organic waveguides. In some embodiments, the waveguides W1, W2 are silicon-nitride organic waveguides. The dielectric layer may be formed by a semiconducting or insulating material, such as Silicon, Silicon Nitride, Silicon Oxide, Aluminum Oxide, Titanium Oxide, Hafnium Oxide, Titanium Nitride, Germanium, Indium Gallium Arsenide, or a material containing nanoparticles, organic materials, ferroelectric materials, materials featuring a second-order non-linearity, or liquid crystals.

The push-pull device 10 according to the present disclosure may include electrically conductive structures T11, T12, T21, T22 formed from a conductive material, such as one or more metal layers comprising or consisting of Gold (Au), Silver (Ag), Copper (Cu), Aluminium (Al), or Titanium (Ti), Chromium (Cr), Tantalum (Ta), Tungsten (W), Palladium (Pd), Platinum (Pt), or an alloy thereof, or other conductive materials such as semiconducting materials.

Applying an electrical field to the electrodes S11, S12, S21, S22 for establishing poling P of the waveguides W1, W2 of the push-pull device 10 according to the present disclosure may include connecting voltages V+, V− to electrodes S11, S12, S21, S22. Furthermore and/or alternatively, the voltages V+, V− may be connected to electrically conductive structures T11, T12, T21, T22. Furthermore, first voltages V+, V− may be connected to first electrodes S11, S12, S21, S22/electrically conductive structures T11, T12, T21, T22, and second voltages V+, V− may be connected to second pair electrodes S11, S12, S21, S22/electrically conductive structures T11, T12, T21, T22. Furthermore, one or more of the electrodes S11, S12, S21, S22/electrically conductive structures T11, T12, T21, T22 may be connected to ground.

The push-pull device 10 according to the present disclosure may include electrically conductive elements C1, C2 which include bonding wires, electrically conductive printed structures, conductive thin-films, or an electrical switch.

The push-pull device 10 according to the present disclosure may include electrically conductive structures T11, T12, T21, T22 which have dimensions that are smaller by a factor of more than 10 compared to a radiofrequency wavelength and therefore having a lumped design.

The push-pull device 10 according to the present disclosure may include waveguides W1, W2 and electrodes S11, S21, S21, S22 which originate from a pre-fabrication process which includes a lithographic process.

The push-pull device 10 according to the present disclosure may include electrically conductive structures T11, T12, T21, T22 which originate from a pre-fabrication process which includes a lithographic process or from a post-fabrication process which includes a lithographic or a non-lithographic process.

The push-pull device 10 according to the present disclosure may include electrically conductive elements C1, C2 which originate from a post-fabrication process which includes a lithographic or a non-lithographic process.

In some embodiments, the waveguides W1, W2 and the electrodes S11, S12, S21, S22 originate from a pre-fabrication process which may include electron beam lithography and a liftoff process applied to e-beam evaporated gold, and/or a negative tone electron-beam resist may be used.

Finally, it should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. A push-pull device, comprising:
a first waveguide arranged between a first electrode and a second electrode related to the first waveguide,
a second waveguide arranged between a first electrode and a second electrode related to the second waveguide,
one or more electrically conductive structures extending away from one or more of the electrodes and electrically connecting at least two of the electrodes,
the waveguides and the electrodes originating from a pre-fabrication process,
the waveguides being poled by a poling originating from a poling process which includes applying an electrical field between at least two of the electrodes,
the electrically conductive structures originating from the pre-fabrication process,
wherein one or more of the electrically conductive structures extend to one or more electrically non-conductive gaps,
wherein the device further comprises one or more electrically conductive elements for electrically connecting two of the electrodes, the electrically conductive elements being related to the electrically non-conductive gaps and originating from a post-fabrication process, and
wherein the one or more of the electrically conductive elements is arranged at the one or more of the electrically non-conductive gaps.

2. The device of claim 1, wherein one of the electrically conductive structures extends away from one of the electrodes to a first electrically non-conductive gap, and another one of the electrically conductive structures extends away from another one of the electrodes to the first electrically non-conductive gap.

3. The device of claim 1, wherein one or more of the electrically conductive structures extends away from one of the electrodes to a first electrically non-conductive gap arranged between the first electrically conductive structure and one of the other electrodes.

4. The device of claim 1, wherein one or more of the electrically conductive structures have a lumped design.

5. The device of claim 1, wherein the second electrode of the first waveguide and the first electrode of the second waveguide are formed from a single electrode.

6. The device of claim 1, wherein one or more of the electrically conductive elements includes an electrically conductive bonding wire, an electrically conductive printed structure, or an electrical switch.

7. The device of claim 1, wherein the pre-fabrication process includes a lithographic process falling above a pre-defined quality level and the post-fabrication process includes a lithographic process falling below the pre-defined quality level and/or a non-lithographic process.

8. The device of claim 1, wherein the waveguides essentially extend along a line or along a ring or along a racetrack.

9. The device of claim 1, configured as one or more of: a plasmonic-organic hybrid device, a plasmonic device, a ferroelectric device, a silicon-organic hybrid electro-optical device, an organic modulator device, a dielectric-organic hybrid device, a transmitter, a phase modulator, a ring modulator, a racetrack modulator, a resonant modulator, a Mach-Zehnder modulator, and an in-phase/quadrature-phase modulator.

10. A method for fabricating a push-pull device, comprising:
a pre-fabrication process, which includes:
arranging a first waveguide between a first electrode and a second electrode related to the first waveguide,
arranging a second waveguide between a first and a second electrode related to the second waveguide,
arranging one or more electrically conductive structures which extend away from one or more of the electrodes to at least one electrically non-conductive gap,
a poling process, which includes applying an electrical field between at least two of the electrodes,
a post-fabrication process, which includes:
arranging at least one electrically conductive element related to the at least one electrically non-conductive gap for electrically connecting two of the electrodes,
wherein the post-fabrication process includes arranging one or more of the at least one electrically conductive element at one or more of the at least one electrically non-conductive gap.

11. The method of claim 10, wherein the pre-fabrication process includes arranging one of the electrically conductive structures extending away from one of the electrodes to a first electrically non-conductive gap, and another one of the electrically conductive structures extending away from another one of the electrodes to the first electrically non-conductive gap.

12. The method of claim 10, wherein the pre-fabrication process includes arranging one or more of the electrically conductive structures extending away from one of the electrodes to a first electrically non-conductive gap arranged between the first electrically conductive structure and one of the other electrodes.

13. The method of claim 10, wherein the pre-fabrication process includes arranging one or more of the electrically conductive structures having a lumped design.

14. The method of claim 10, wherein the pre-fabrication process includes a lithographic process falling above a pre-defined quality level and the post-fabrication process includes a lithographic process falling below the pre-defined quality level and/or a non-lithographic process.

15. A push-pull device, comprising:
a first waveguide arranged between a first and a second electrode related to the first waveguide,
a second waveguide arranged between a first electrode and a second electrode related to the second waveguide,
one or more electrically conductive structures extending away from one or more of the electrodes and electrically connecting at least two of the electrodes,
the waveguides and the electrodes originating from a pre-fabrication process,
the waveguides being poled by a poling originating from a poling process which includes applying an electrical field between at least two of the electrodes,
the electrically conductive structures originating from the pre-fabrication process,
wherein one or more of the electrically conductive structures extend to one or more electrically non-conductive gaps, wherein the device further comprises one or more electrically conductive elements for electrically connecting two of the electrodes, the electrically conductive elements being related to the electrically non-conductive gaps and originating from a post-fabrication process, and wherein one of the electrically conductive structures extends away from one of the electrodes to a first electrically non-conductive gap, and another one of the electrically conductive structures extends away from another one of the electrodes to the first electrically non-conductive gap.

16. A method for fabricating a push-pull device, comprising:

a pre-fabrication process, which includes:

arranging a first waveguide between a first electrode and a second electrode related to the first waveguide, arranging a second waveguide between a first electrode and a second electrode related to the second waveguide, arranging one or more electrically conductive structures which extend away from one or more of the electrodes to at least one electrically non-conductive gap, a poling process, which includes applying an electrical field between at least two of the electrodes, a post-fabrication process, which includes arranging at least one electrically conductive element related to the at least one electrically non-conductive gap for electrically connecting two of the electrodes, wherein the pre-fabrication process includes a lithographic process falling above a pre-defined quality level, and the post-fabrication process includes a lithographic process falling below the pre-defined quality level and/or a non-lithographic process.

* * * * *